Oct. 30, 1928.

P. LANHAM 1,689,491

PROPORTIONAL FEED CONTROLLING APPARATUS

Filed Dec. 20, 1926

INVENTOR.
Paul Lanham
BY
O'Neill & Bunn
ATTORNEYS.

Patented Oct. 30, 1928.

1,689,491

UNITED STATES PATENT OFFICE.

PAUL LANHAM, OF LANHAM, MARYLAND.

PROPORTIONAL-FEED-CONTROLLING APPARATUS.

Application filed December 20, 1926. Serial No. 155,935.

The invention relates to proportional feed controlling apparatus associated with and the actuation thereof controlled by a meter for measuring the rate of flow of a fluid, a specific application of the invention involving the automatic control of the supply of a material proportionately to the rate of flow of a fluid in a conduit, as, for example, the accurate dosing of a water supply with a chemical, such as chlorine.

The invention is illustrated in the accompanying drawings, in which:—

Figures 1, 2:
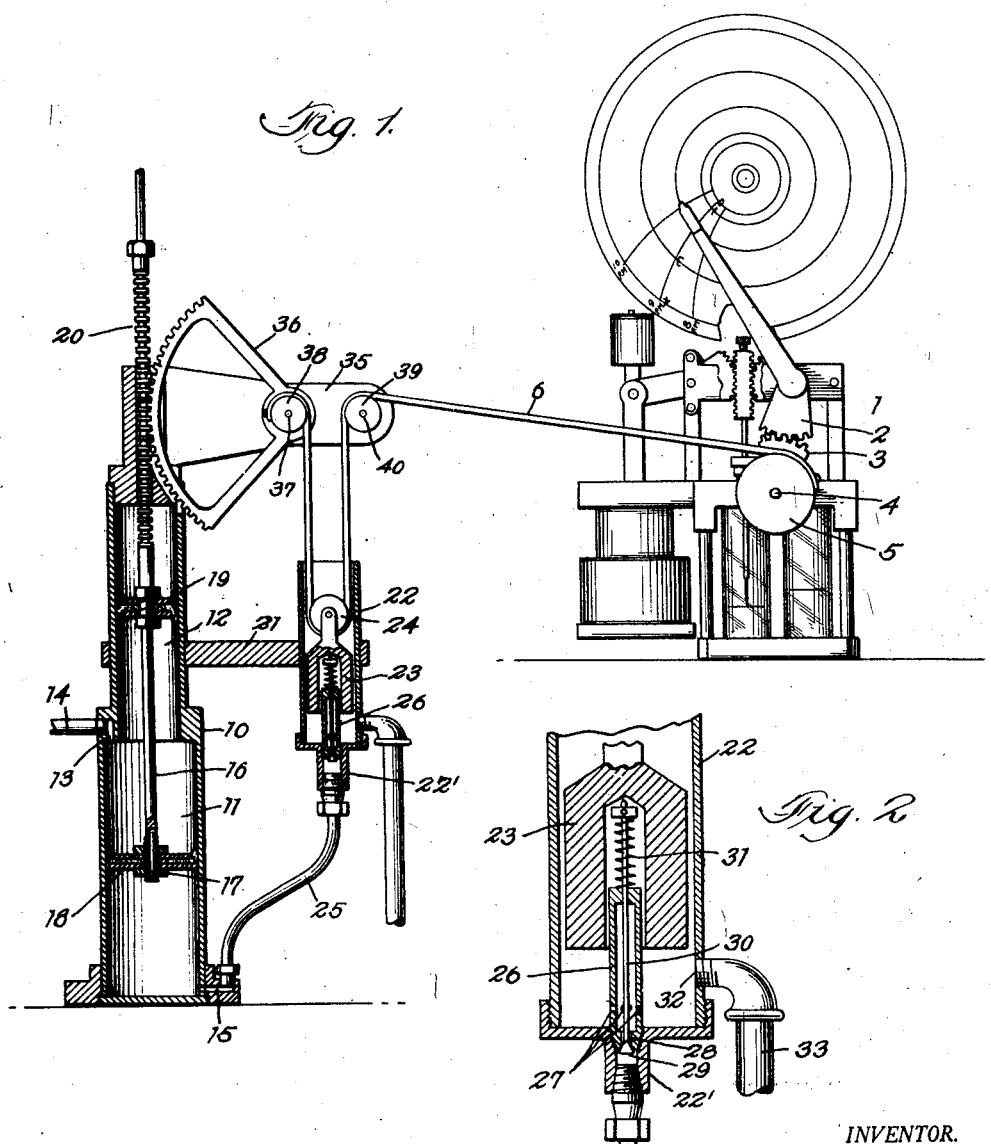
Fig. 1 is a sectional elevation of the proportional supply control motor, associated with a flow recording meter.
Fig. 2 is an enlarged fragmentary sectional elevation of the motor controlling valve.

Referring to the drawings, 1 indicates a recording meter, or manometer, illustrated and described in my prior Patent No. 1,326,747, dated December 30, 1919, which comprises a movable stylus, a fluid column variable with the force to be measured, a reciprocatory contact cooperating with said column, a reversible motor, a connection between the motor and contact member to move the contact into and out of engagement with the column, a circuit closed between the contact and column and including means to effect reversal of the motor, connections between the stylus and gearing effective to move the stylus in accordance with the variations in the fluid column and resultant variations in the movement of the motor. Secured to the shaft of the stylus is a segmental gear 2, which meshes with a second segmental gear 3 mounted upon a shaft 4, journaled in the meter frame, to the outer end of which shaft 4 is secured a pulley 5, the specific purpose and effect of this co-ordination being to bring about a rotary movement of said pulley 5, which is exactly proportional to the movement of the stylus and, therefore, to the rate of flow of the fluid which is measured, indicated and recorded by the meter, as fully set forth in the patent aforesaid.

It will be understood that the meter, as illustrated and described, is more or less diagrammatic and that reference to the patent aforesaid is indicated and required for the details of construction and operation of said meter. It is to be further understood that the meter is referred to merely as typical or exemplary of any type of flow recording meter, which involves moving parts developing sufficient power to operate the control element of a motor, which latter is adapted to proportionately control the supply of the material with reference to the movement of the meter indicating mechanism, which motor per se and in combination with such a meter constitutes the instant invention. The motor comprises a pedestal-like casing 10 having a lower cylindrical bore 11 and a smaller upper cylindrical bore 12, in which bores are fitted differential pistons 18 and 19 mounted on a rod or stem 16, the upper portion of which is provided with a series of annular gear teeth 20. The upper part of the cylinder 11 has an inlet port 13 connected with a supply of fluid pressure by pipe 14. The lower end of piston rod 16 has a duct 17 therein, which provides restricted communication between the spaces above and below the piston 18. The base of the casing 10 has a discharge duct 15 therein, which is connected by pipe 25 with a nipple 22' on the base of an open topped casing 22, which is supported by a bracket 21 secured to the main casing 10. Threaded into the upper portion of the nipple 22' is a tubular casing 26 having a conical opening in its bottom forming a seat for an exhaust valve 29, which latter is provided with a stem 30 extending upward through the casing 26 and provided with an adjustable spring 31 on its upper end, which normally tends to seat the valve 29. Valve casing 26 has vent openings 27 therein above the valve seat and the casing 22 has a discharge opening 32, adjacent its bottom, connected with an exhaust pipe 33.

Attached to the upper part of the motor casing 10 is a laterally extending bracket 35 to which is secured a stub shaft 37 upon which is mounted a toothed sector, the teeth of which mesh with the gear teeth on the piston rod 16, so that rotary movement is imparted to the sector by the reciprocatory movement of the piston rod. Secured to the axis of the sector 36 is a pulley 38, to the periphery of which is anchored one end of a strap 6, the other end of which is fixed to the pulley 5 mounted on the meter frame, as hereinbefore explained. The forward end of the bracket 35 has mounted thereon a stub shaft 40, upon which is journalled a guide pulley 39, over which said strap 6 passes. The loop of the strap 6 between pulleys 38 and 39 supports a weight 23, which has a pulley 24 mounted in the top thereof, which is engaged by the strap, as shown, the weight 23 being moved up and down in the casing 22 by the movements of the strap 6, so that the weight is effective in opening the relief valve 29 by reason of the engagement of the weight with the upper end of the valve stem 30, or permitting the relief valve to close in whole or in part, when the weight is moved upward.

The piston rod 16 is adapted to be attached at its upper end to a feed regulating device of any appropriate type, such, for example, as the head tube of a standard chlorinator, or a feed valve, the extent of opening of which will be accurately regulated by the movement of the piston rod 16. No specific type of regulating device has been illustrated, for the obvious reason that the motor, as described and illustrated, is adapted to operate any and all types of feed regulating mechanism that are susceptible of being operated either manually or mechanically. As hereinbefore stated, one particular application of the apparatus as hereinbefore described, is the dosing of a water supply with chlorine, or an equivalent purifying chemical, which must be supplied to the water in exactly predetermined proportions and the apparatus is effective in regulating the amount of chlorine fed to the water in exact proportion to the rate of the flow of the water in the main or conduit to which the meter 1 is connected. The operation of the apparatus in such an application is as follows: Fluid pressure entering the cylinders 11 and 12, by way of supply pipe 14 and inlet 13, exerts an upward pressure on the small piston 19 and a downward pressure on the larger piston 18. Both pistons will move downward if and when the water in the lower part of the cylinder 11 below the piston 18 escapes through relief valve 29 faster than it enters said lower portion of the cylinder 11 through the vent opening 17 in the piston rod 16. It is evident, therefore, that downward movement of the two pistons and their rod 16 is affected by opening the relief valve. If the relief valve 29 is closed, thereby preventing the escape of fluid pressure from the cylinders 11 and 12, the pressure on opposite sides of the lower and larger piston 18 will be balanced, so that the predominant pressure on the under side of piston 19 will force the latter upward, carrying with it the lower piston 18 and the piston rod 16. The balanced or stationary position of the differential pistons is accomplished by a partial opening of the relief valve 29, so that the water escaping from the cylinders by way of the relief valve reduces the pressure on the lower side of piston 18 to a point equalling in effect the downward pressure above the said piston, less the upper pressure exerted upon the under side of the piston 19. It will be seen, therefore, that the operation of the differential pistons and the piston rod 16, which latter actuates the controlling means for the supply of chlorine, or the like, is effected by raising and lowering the weight 23, mounted above and in engagement with the stem 30 of the relief valve 29. It also will be noted that the movement of the piston rod 16 effects a corresponding movement of the sector 36 and the resultant effect of the sequential movements, first, of the pulley 5, which is exactly proportional to the movement of the meter indicator, and of the sector 36, will effect an adjustment of the relief valve 29 to retain the differential pistons in their position of adjustment. As indicated, the operation of the relief valve 29 is accomplished by raising and lowering the weight 23, which is suspended over the stem 30 of said relief valve, the movement of the weight being brought about by pulling or slacking of the cable over the pulleys, as shown. Inasmuch as one end of the cable is carried over and attached to the pulley 5, on the meter, and the other end is anchored to the pulley 38 secured to the sector 36, the rotary movement of either of these pulleys will effect a corresponding movement of the weight. The length of the cable is so adjusted that, with the supply mechanism controlled by the motor is at zero or closed position and the recording element or stylus of the meter also at zero position, the relief valve is balanced and the motor pistons are stationary. Under these conditions, there is no flow of fluid to be measured and consequently there is no supply of chlorine, or other material, to be delivered. When, however, the meter begins to measure the rate of flow of the fluid, the movement of the pen arm of the meter effects a commensurate rotation of pulley 5, which draws on the cable 6 and raises the weight 23 from engagement with the stem of the relief valve 29 and the latter immediately closes, due to the action of spring 31 as well as the fluid pressure on the lower side of the valve. The closing of the relief valve 29 causes the differential pistons 18 and 19 to rise, thereby actuating the piston rod 16 and the controlling element, such as the head tube or supply valve of the chlorinator. The upward movement of the rod 16 rotates the sector 36, which slackens the cable 6 and lowers the weight 23 again into contact with the stem of the relief valve 29, thereby opening the valve and permitting the fluid pressure in the cylinders 11 and 12 to escape until the forces acting on the differential pistons are balanced and said pistons remain stationary. It will be seen, therefore, that the movement of the motor piston rod is an exact multiple of the movement imparted to the cable by the recorder of the meter. Thus, if the recorder draws up one-half inch of the cable, the motor piston will rise a distance sufficient to restore the original length of cable between the pulleys 5 and 38, respectively, by paying out the cable from off the pulley on the sector 36. By regulating the radius of the sector and the diameters of the pulley carried by the sector and the pulley operated by the recording element of the meter, it is possible to obtain any desired movement of the piston rod of the motor and a corresponding adjustment of the feed regulator, but, in all such adjustments, the movement of the piston rod 16 will be directly proportional to the movement of the recording device of the meter, so that the supply of chlorine, or other material in the feeding device, will be regulated in exact proportion to the rate of flow of the fluid recorded by the meter.

Preferably, the pulley 5 on the meter frame is provided with steps of varying radii, so that, by anchoring the end of the cable 6 to the proper step, the supply of chlorine, or other material, which is directly controlled by the operation of the piston rod 16, may be accurately regulated for a proper maximum and still be in direct proportion to the flow of a fluid registered by the meter and, therefore, exactly proportioned to the amount of the fluid.

What I claim is:

1. The combination of a meter for measuring the rate of flow of a fluid, a motor for operating a material feed control device, and mechanical connections between the meter and the motor to effect the actuation of the latter proportionately to the rate of flow indicated by the meter.

2. The combination of a motor for proportionate material feeding devices comprising differential cylinders and pistons, a rod connecting the pistons and adapted to actuate the material feed control, a fluid pressure supply connected to the cylinders between the pistons, a port connecting the larger cylinder above and below the piston therein, an exhaust valve controlling the rate of exhaust from said larger cylinder, primary means including the motor of a fluid meter for operating said exhaust valve to effect movement of the pistons, and means operated by the movement of the piston rod to restore the exhaust valve to a position effective to arrest the movement of the pistons.

3. The combination of a motor for proportionate material feeding devices comprising differential cylinders and pistons, a rod connecting the pistons and adapted to actuate the material feed control, a fluid pressure supply connected to the cylinders between the pistons, a port connecting the larger cylinder above and below the piston therein, a self-closing exhaust valve for controlling the rate of exhaust from said larger cylinder, primary means including the motor of a fluid meter for opening said exhaust valve to effect movement of the pistons, and means operated by the movement of the piston rod to restore the exhaust valve to a position effective to arrest the movement of the pistons.

4. A motor for porportionate material feeding devices comprising differential cylinders and pistons, a rod connecting the pistons and adapted to actuate the material feed control, a fluid pressure supply connected to the cylinders between the pistons, a port connecting the larger cylinder above and below the piston therein, a self-closing exhaust valve for controlling the rate of exhaust from said larger cylinder, a weight for opening said exhaust valve, a cable movably suspending said weight, means for slacking said cable to lower the weight to open the exhaust valve, and means actuated by the movement of the pistons to take up the slack in the cable and restore the exhaust valve to a position effective to arrest the movement of the pistons.

5. A motor for porportionate material feeding devices, comprising differential cylinders and pistons, a rod connecting the pistons and adapted to actuate the material feed control, a fluid pressure supply connected to the cylinders between the pistons, a port connecting the larger cylinder above and below the piston therein, a self-closing exhaust valve for controlling the rate of exhaust from said larger cylinder, a weight for opening said exhaust valve, a cable suspending said weight, a motor operated meter to the operating means of which one end of the cable is attached, a sector geared to the piston rod to be moved thereby, and means carried by the sector to which the other end of the cable is attached and which is effective to produce an equal and opposite movement of the cable to that produced by the meter, whereby the exhaust valve will be restored to a position effective to arrest the movement of the pistons.

In testimony whereof I affix my signature.

PAUL LANHAM.